United States Patent
Herrmann et al.

(10) Patent No.: US 10,353,652 B2
(45) Date of Patent: Jul. 16, 2019

(54) DYNAMIC IMPOSITION IDENTIFIER FOR ITEMS CUT FROM SHEETS

(71) Applicant: Xerox Corporation, Norwalk, CT (US)

(72) Inventors: Douglas K. Herrmann, Webster, NY (US); Daniel M. McHugh, Rochester, NY (US); Timothy J. Kelley, Pittsford, NY (US); Hans F. Case, Jordan, MN (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/678,270

(22) Filed: Aug. 16, 2017

(65) Prior Publication Data
US 2019/0056895 A1 Feb. 21, 2019

(51) Int. Cl.
*B26D 5/00* (2006.01)
*B26D 7/32* (2006.01)
*G06F 3/12* (2006.01)
*H04N 1/00* (2006.01)
*H04N 1/32* (2006.01)

(52) U.S. Cl.
CPC .......... *G06F 3/1234* (2013.01); *B26D 5/005* (2013.01); *B26D 7/32* (2013.01); *G06F 3/1204* (2013.01); *G06F 3/1243* (2013.01); *H04N 1/00567* (2013.01); *H04N 1/00631* (2013.01); *H04N 1/32203* (2013.01); *H04N 1/32352* (2013.01); *B26D 2007/322* (2013.01); *H04N 1/00676* (2013.01); *H04N 2201/0094* (2013.01); *H04N 2201/3222* (2013.01)

(58) Field of Classification Search
None
See application file for complete search history.

(56) References Cited

U.S. PATENT DOCUMENTS

| | | | |
|---|---|---|---|
| 4,633,395 A | 12/1986 | Kuehfuss | |
| 4,785,165 A | 11/1988 | Kruk | |
| 5,141,572 A | 8/1992 | Gerber | |
| 5,241,483 A * | 8/1993 | Porret | B26D 5/007 101/484 |
| 5,709,297 A * | 1/1998 | Brandriff | B65D 73/00 206/6.1 |

(Continued)

FOREIGN PATENT DOCUMENTS

WO 2002037196 A2 5/2002

*Primary Examiner* — Miya J Williams
(74) *Attorney, Agent, or Firm* — Gibb & Riley, LLC

(57) ABSTRACT

A job includes pages that have multiple items positioned according to coordinates. A sheet coordinate location identifier for each of the items (that corresponds to the coordinates for the items) is added to the job. The job is printed to produce printed sheets of items (printed items) printed according to the coordinates. A cutting device cuts the printed sheets, according to the coordinates, into individually cut items. Each of the cut items includes the sheet coordinate location identifier printed thereon, and this identifies the pre-cutting locations of the cut items within the uncut sheets of print media. The cut items are inspected for cutting defects to identify defective items. Pre-cutting locations of the defective items are identified using only the sheet coordinate location identifier printed on the defective items. A repair recommendation for the cutting device is based on the most common pre-cutting location of the defective items.

20 Claims, 9 Drawing Sheets

(56) References Cited

U.S. PATENT DOCUMENTS

| | | | |
|---|---|---|---|
| 6,298,275 B1 | 10/2001 | Herman, Jr. | |
| 6,968,783 B2 * | 11/2005 | Hug | B41F 11/02 |
| | | | 101/170 |
| 8,302,338 B2 | 11/2012 | Engelby et al. | |
| 8,390,897 B2 | 3/2013 | Carey | |
| 8,663,410 B2 | 3/2014 | Cummins et al. | |
| 9,258,452 B1 * | 2/2016 | Eschbach | H04N 1/32352 |
| 9,375,892 B2 * | 6/2016 | Nagahara | B31D 1/021 |
| 2005/0168775 A1 * | 8/2005 | Liu | H04N 1/00132 |
| | | | 358/1.15 |
| 2008/0074453 A1 * | 3/2008 | Furukawa | B41J 2/2142 |
| | | | 347/14 |
| 2012/0200885 A1 * | 8/2012 | Matsuzawa | B41J 11/46 |
| | | | 358/1.15 |
| 2012/0307276 A1 * | 12/2012 | Takenaka | G06K 15/1823 |
| | | | 358/1.13 |
| 2014/0071486 A1 * | 3/2014 | Van Bauwel | G06F 3/1296 |
| | | | 358/1.15 |
| 2014/0300918 A1 * | 10/2014 | Kiriyama | G06K 9/00442 |
| | | | 358/1.14 |
| 2016/0070256 A1 * | 3/2016 | Safai | G05B 19/401 |
| | | | 700/98 |
| 2017/0011286 A1 * | 1/2017 | Kouguchi | G06K 15/027 |

* cited by examiner

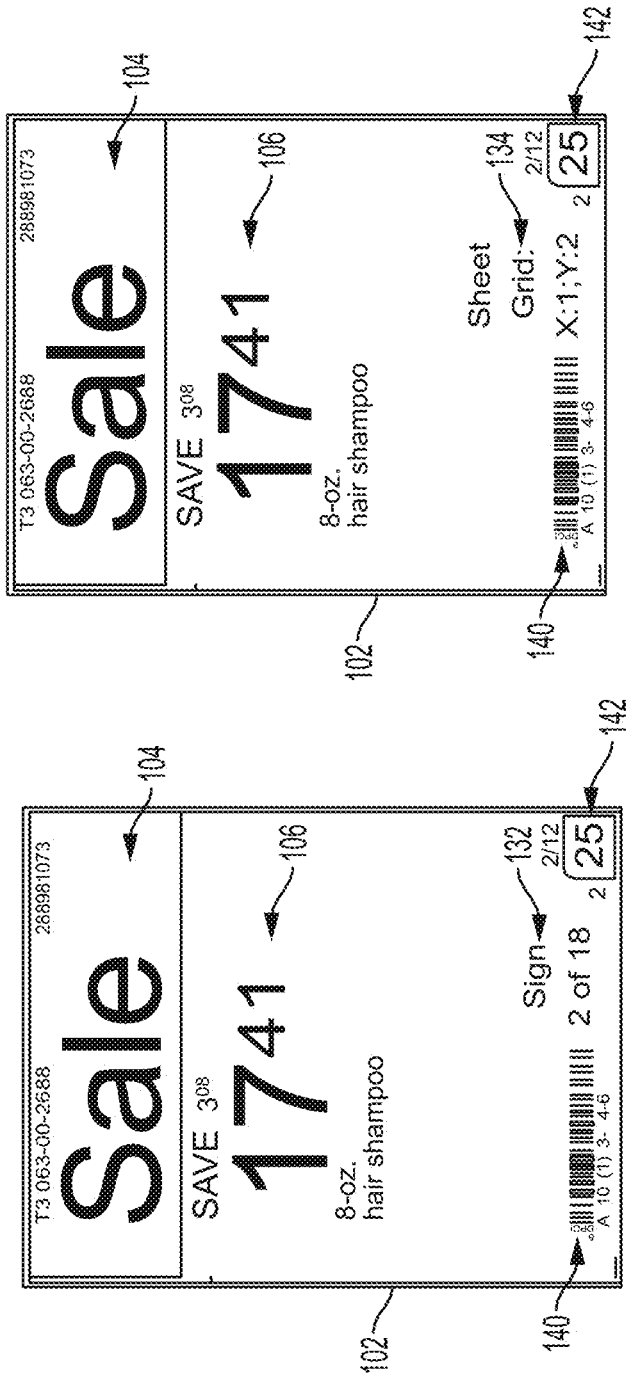

DYNAMIC IMPOSITION IDENTIFIER FOR ITEMS CUT FROM SHEETS

BACKGROUND

Systems and methods herein generally relate to printing and cutting systems, and more particularly to identifying sheet locations of items, after such items are separated from the sheets (e.g., after the sheet is cut into the individual items).

When creating uniquely sized printed items, such as signs, cards, tickets, badges, negotiable instruments, etc., it is efficient to print sheets of such items, and then divide (e.g., cut) the sheets into individual items (e.g., individual signs). For example, an X-Y cutter that first cuts slits in one direction, and then cuts slits in a perpendicular direction, can be used to cut fully backed adhesive media into individual rectangular adhesive items. Other types of cutters include laser cutters, punch cutters, etc. After cutting, the individual items are collated into bins and stacked (e.g., after several sheets have been processed).

However, as the cutting and stacking system is used and wears, adhesive can build up on the stacking and cutting components, or the variation of printing media within a run (or between runs) can wear alignment features, dull blades, etc., and cause errors in the cutting and stacking operations. Also, with slit-type cutters, the slits can be dynamic depending on constantly changing item size, which adds another factor to cutting issues.

SUMMARY

Methods herein receive printing and sheet cutting information into a printing system, and a processor of the printing system automatically combines the printing and sheet cutting information, to produce a print and cut job that includes pages. For example, this process can involve a variable information print job to merge the printing and sheet cutting information into the print and cut job. Each of the pages includes multiple items positioned according to coordinates. With these methods, the processor automatically adds a sheet coordinate location identifier that corresponds to the coordinates for such items, to each of the items in the print and cut job.

Such methods automatically print the print and cut job on sheets of print media using a printing device of the printing system, to produce printed sheets of items (printed items) printed on the printed sheets according to the coordinates. The printed items can each contain different printing, within a given one of the printed sheets. The methods herein automatically cut the printed sheet using an automated cutting device of the printing system to separate the printed sheet, according to the coordinates, into individually cut items.

Thus, with methods herein, each of the cut items includes the sheet coordinate location identifier printed thereon, and this sheet coordinate location identifier printed on each the cut items individually identifies the pre-cutting locations of each specific item within the sheets of print media (e.g., where the cut items were before the sheets of print media were cut by the automated cutting device). The sheet coordinate location identifier can be, for example, a two-dimensional grid location within the printed sheets. The printed items include printed graphics, and the sheet coordinate location identifier can be a hidden feature within the printed graphics, the sheet coordinate location identifier can be micro-printing on the printed items, etc. Further, the sheet coordinate location identifier can be located to be obscured or hidden by a holder into which the cut items can be subsequently mounted.

After this, these methods inspect the cut items for cutting defects to identify defective items. Such methods also identify (automatically or manually) the pre-cutting locations of the defective items, using only the sheet coordinate location identifier printed on the defective items. Further, methods herein automatically maintain statistics of the pre-cutting locations of the defective items to identify the most common pre-cutting location of the defective items. This allows these methods to automatically produce a repair recommendation for the cutting device based on the most common pre-cutting location of the defective items.

Various printing systems herein include a processor that is capable of using printing and sheet cutting information to automatically produce a print and cut job that includes pages, where each of the pages includes multiple items positioned according to coordinates. For example, the processor can produce the print and cut job by combining the printing and sheet cutting information into the print and cut job as a variable information print job. Within each of the printed sheets, each of the printed items can contain different printing. The processor automatically adds a sheet coordinate location identifier that corresponds to the coordinates for such items, to each of the items in the print and cut job.

These systems also include a printing device that is capable of automatically printing the print and cut job on sheets of print media to produce printed sheets of the items (printed items) printed according to the coordinates. An automated cutting device is also included in these systems. The automated cutting device is capable of automatically cutting the printed sheet to separate the printed sheet, according to the coordinates in the print and cut job, into individually cut items.

Again, each of the cut items includes the sheet coordinate location identifier printed thereon to identify the pre-cutting locations of the cut items within the sheets of print media (before the sheets of print media were cut by the automated cutting device). The sheet coordinate location identifier can be a two-dimensional grid location within the printed sheets. The printed items can include printed graphics, and the sheet coordinate location identifier can be a hidden feature within the printed graphics, or the sheet coordinate location identifier can be micro-printing on the printed items. Further, the sheet coordinate location identifier can be located to be obscured or hidden by a holder into which the cut items can be subsequently mounted.

The pre-cutting locations of the defective items are identifiable using only the sheet coordinate location identifier. Statistics are maintained of the pre-cutting locations of the defective items to identify the most common pre-cutting location of the defective items. The processor is capable of producing a repair recommendation for the printing system based on these most common pre-cutting locations of the defective items.

These and other features are described in, or are apparent from, the following detailed description.

BRIEF DESCRIPTION OF THE DRAWINGS

Various exemplary systems and methods are described in detail below, with reference to the attached drawing figures, in which:

FIG. 3-7 are schematic diagrams illustrating cut items produced herein;

DETAILED DESCRIPTION

Figure 1:
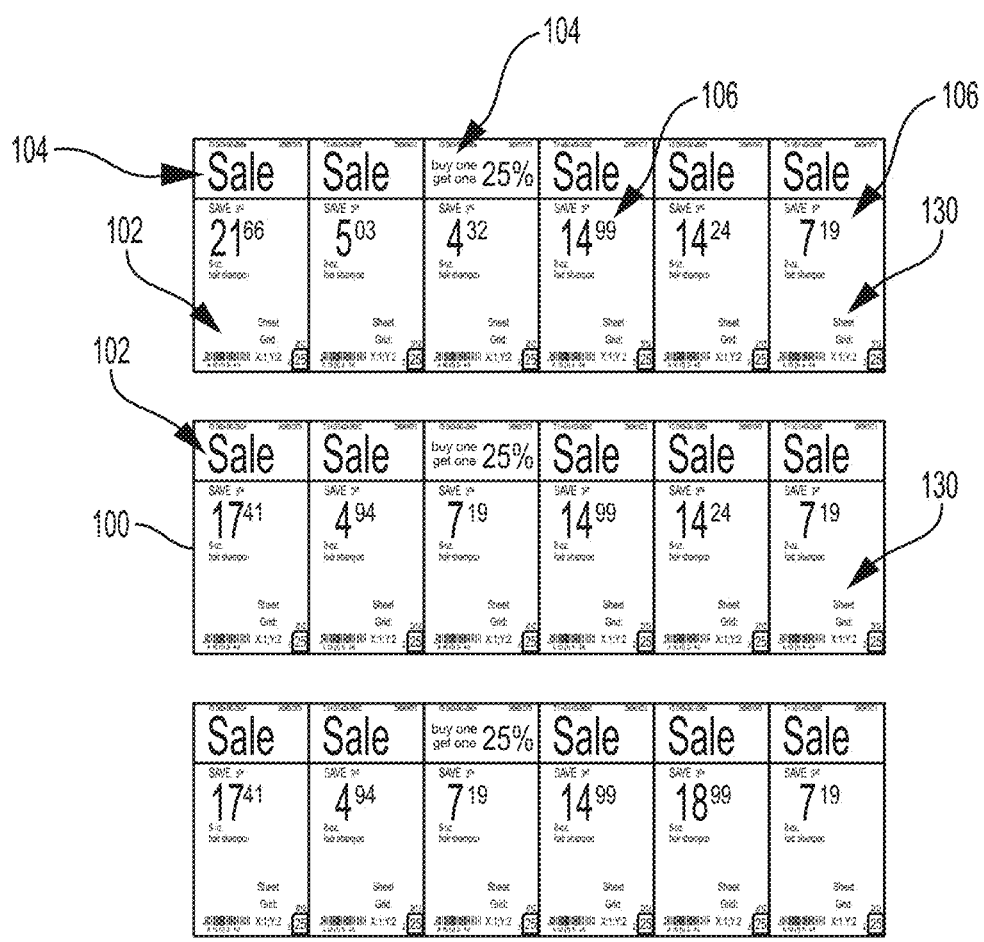
FIG. 1 is a schematic diagram illustrating printed sheets produced herein.

As mentioned above, when creating uniquely sized printed items, such as signs, cards, tickets, badges, negotiable instruments, etc., systems print sheets of such items, and then divide (e.g., cut) the sheets into individual items (e.g., individual signs). For example, an X-Y cutter can first cut slits in one direction, and then cuts slits in a perpendicular direction. Other types of cutters include laser cutters, punch cutters, etc. Thus, in one implementation, cutters can be used to cut fully backed adhesive media into individual rectangular adhesive signs. After cutting, the individual signs are collated into bins and stacked (e.g., after several sheets have been processed).

However, as the cutting and stacking system is used and wears, adhesive can build up on the stacking and cutting components, or the variation of printing media within a run (or between runs) can wear alignment and cutting features and cause errors in the cutting and stacking operations. Also, with slit-type cutters, the slits can be dynamic depending on sign size, which adds another factor to defect issues.

These cutting or stacking issues are generally only detected after all items on the sheets have been divided into individual items (e.g., at the collation or stacking stage), or even potentially after such items have been packaged and delivered to the final destination of use, and there is no way to determine which component (e.g., which blade set) may be causing the issue. While certain physical characteristics may suggest sources of the cutting issues (e.g., which edge of the cut items is affected, etc.), or the sheet row can be identified (where each row is dedicated to a specific a row collator bin), there is no way of knowing exactly where the items having defects were on the sheets before the sheets were cut.

This is especially true with variable information printing, where all cut items can be different from one another, and there is no set sheet location for an individual item that can be identified in the job imposition (e.g., no pre-cutting sheet location can be determined from the individual printed item alone). More specifically, in variable information printing, the job imposition of printed items within the sheets, which includes printing and locations of cuts to be made to the sheets, are dynamic and change based on the variable information supplied, preventing the sheet location from being determined from the job imposition.

In view of these issues, the methods and systems herein print a unique pre-cutting sheet coordinate location identifier on each item that is different from all other pre-cutting sheet coordinate location identifier printed on other items within a given sheet. Each unique sheet coordinate location identifier notes the specific location (e.g., grid location) of one item on the sheet, and such a unique sheet coordinate location identifier remains printed on the cut item after it has been cut. The unique sheet coordinate location identifier can be used to identify specific parts of the machine and/or stages of the printing, cutting, and stacking process that are introducing defects (or non-conforming products) into the process. In other words, this allows the systems herein to quickly determine the location of the defectively printed/cut item on the sheet, and use this information to identify which part of the finishing system is responsible for generating the anomalies. Further, this additional information can be used to track machine performance over time, allowing the design of future machines to be changed to prevent chronic defect issues from recurring.

As described below, the methods and system herein provide: dynamic imposition identifiers for identifying the pre-cutting sheet location of individual signs within a media sheet, after cutting; processes to impose row and column identifier on dynamically imposed items, such as retail signage; a location identifier for the X-Y cutting operation on the cut items, an automated scan of identifier for data analytics and problem recording, etc. Therefore, with these methods and systems, the identification of card location on each media sheet allows for debugging of downstream slitting operation (when variable data on each card cannot identify a pre-cutting sheet position), and this provides the ability to collect data based on sign location on the sheet (e.g., using existing bar coding and QR codes incorporated into sign identifier, for ease of data collection).

In one exemplary implementation, a central facility can be used to print signs or cards that will be positioned on shelves within retail stores, and the signs identify the price or other information of the products that are on the retail store shelves. Each sign generally contains different printing, and the signs can be different sizes. In this example, the unique sheet coordinate location identifier is automatically embedded in the dynamic print data before printing or cutting, by store identified imposition, so that even as signs change per store, the pre-cutting location of each sign on each sheet can be tracked (even as sign data is varied).

Continuing with this non-limiting example, for each store, and for each week, each print run (circulars, TPC's (Temporary Price Cuts) and ADC's (Ad Corrections)) is unique, as is the number of signs produced, and the imposition (e.g., printing, size) of those signs on the sheets (based on store "planogram" order). Because each store for which signs are printed can use different languages, has different pricing, different items for sale, different promotions, etc., without the unique sign identifier printed on each sign, the pre-cutting sheet position of each sign cannot be determined post-cutting. Therefore, in this example, identifying the blade or position of the problem that caused a defective sign to be produced is almost impossible without the unique sign identifier printed on each sign.

As shown in the drawings, various printing systems herein include a processor 216 (discussed below, and shown in FIG. 10) that is capable of using printing and sheet 100 cutting information to automatically produce a print and cut job that includes pages 100, such as page 100 shown in FIG. 1. Each of the pages 100 includes multiple items 102 positioned according to coordinates. For example, the processor 216 can produce the print and cut job by combining printing and sheet cutting information as a variable information print job.

As shown in FIG. 1, the printed items 102 contain different printing 104, 106, within each of the printed sheets 100. Further, from sheet to sheet (or potentially within one sheet) the items 102 can be different sizes, which use different cuts. For example, as shown in FIG. 1, some of the signs 102 contain artwork 104 generally advertising a "sale" on some signs 102, and specifically advertising "25% off" on other items 102. Similarly, different text (e.g., prices) 106 can be printed on each item 102. As also shown in FIG. 1, the processor 216 automatically adds a sheet coordinate location identifier 130 (shown in greater detail in FIGS. 3-7, discussed below) that corresponds to the pre-cutting sheet coordinates for such items 102, to each of the items 102 in the print and cut job (before printing or cutting).

These systems also include a printing device 204 (discussed below and shown in FIG. 11 in greater detail) that is capable of automatically printing the print and cut job on sheets of print media to produce printed sheets 100 of the items 102 (printed items 102) printed according to the coordinates. The graphics/artwork 104, text 106, and sheet coordinate location identifier 130 are all printed at the same time in a single printing operation before any cutting is performed.

Figure 2:
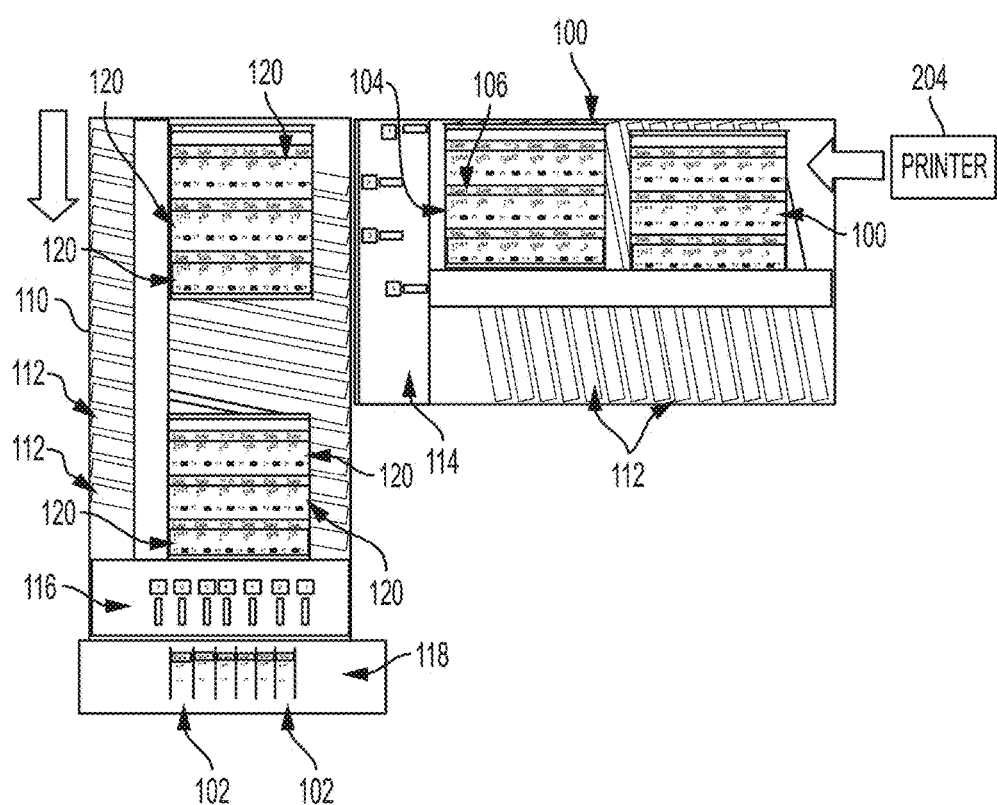
FIG. 2 is a schematic diagram illustrating systems herein.

FIG. 2 illustrates an automated cutting device 110 that is also included in these systems, and that is in communication with the printing device 204 and the processor 216. The automated cutting device 110 is capable of following the imposition in the print and cut job to automatically cut the printed sheet 100 to separate the printed sheet 100, according to the dynamic coordinates in the print and cut job, into individually cut items 102. The cutting device 110 can take numerous forms, and FIG. 2 only illustrates one example of such readily available machines.

More specifically, the cutting device 110 shown in FIG. 2 includes a transport 112 (e.g., belts, rollers, etc.) that moves the uncut sheets 100 from an input location (e.g., from the printer 204) to a first cutter 114. In this example, the first cutter 114 is a slit cutter that only makes many parallel slits in one direction to separate the uncut sheets into slit portions 120 (which may be separated, or still attached together). The conveyor 112 then moves the slit portions 120 in a perpendicular direction to a second cutter 116 (again a slit cutter in this example). The second cutter cuts slits is a direction perpendicular to the first slits, thereby separating all the individual items 102 from the sheet 100, and such items are output to a collection or stacking area 118.

Each of the cut items 102 in the collection or stacking area 118 includes the sheet coordinate location identifier 130 printed thereon to identify the pre-cutting locations of the cut items 102 within the sheets 100 of print media (before the sheets 100 of print media were cut by the automated cutting device 110).

FIGS. 3-7 illustrates that one exemplary cut item 102 includes the artwork 104, text 106, a barcode 140 (to help place the sign on the correct retail store shelf, etc.), other text 142, etc. For example, the machine and human readable information 140, 142 conventionally included is retail signs 102, does not include any identification of a pre-cutting sheet coordinate location, but may identify a retail store or department to which the item/sign 102 is to be delivered, the specific retail shelf and shelf location where the item/sign 102 is to be placed, the printer 204 used to print the sheet 100, the sheet 100 on which it was printed, the date of printing, etc.

As shown in FIG. 3-7, the sheet coordinate location identifier 130 can take many forms. For example, in FIG. 3, the sheet coordinate location identifier 132 can be printing that identifies which consecutively numbered item (e.g., 2 of 18) the item 102 was on the sheet 100 (which would be the second item down in the first column, in this example (e.g., second of 18 items on sheet 100)). In contrast, in FIG. 4, the sheet coordinate location identifier 134 can be printed to identify a two-dimensional X-Y grid location (e.g., X1; Y2) within the printed sheets 100.

Figure 5:

Also, as noted above, the printed items 102 can include printed graphics 104, and as shown in FIG. 5, the sheet coordinate location identifier 136 can be located as a hidden feature within the printed graphics. The curved arrow in FIG. 5 is not part of the item 102 or sheet 100, and is an aid within this patent application to illustrate that the sheet coordinate location identifier 136 cannot normally be viewed with the unaided human eye, and instead can only be viewed using special filters, special lighting, must be viewed at an angle (e.g., microgloss printing, etc.). Thus, the text 136 at the end of the curved arrow in FIG. 5 illustrates what would be revealed when using the appropriate filter, lighting, viewing angle, etc. This allows the sheet coordinate location identifier 136 to be hidden from view (hidden within the graphics 104) to improve the attractiveness of the cut items 102.

Figure 6:
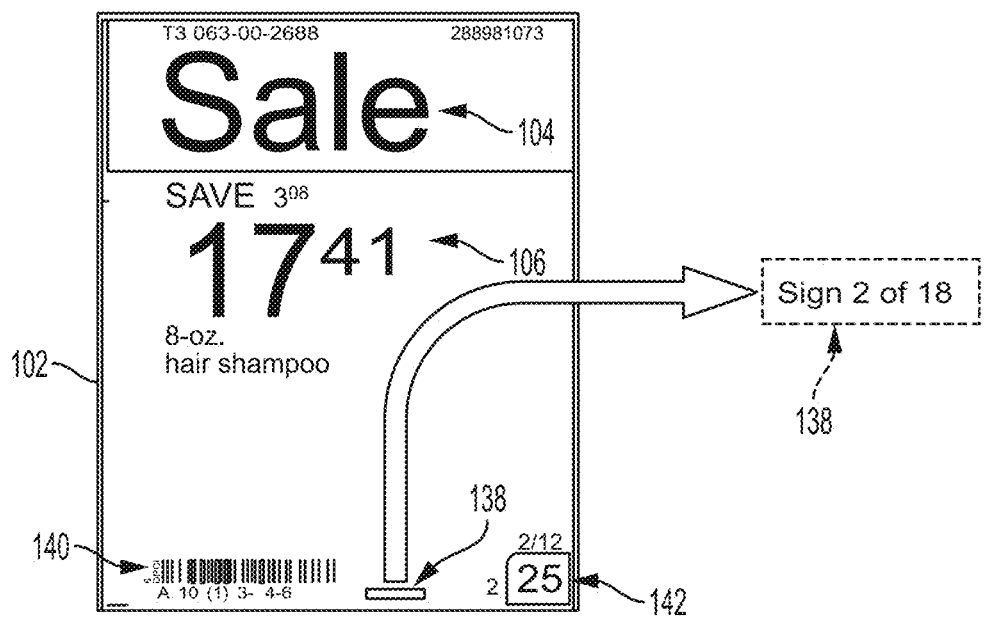
Figure 7:
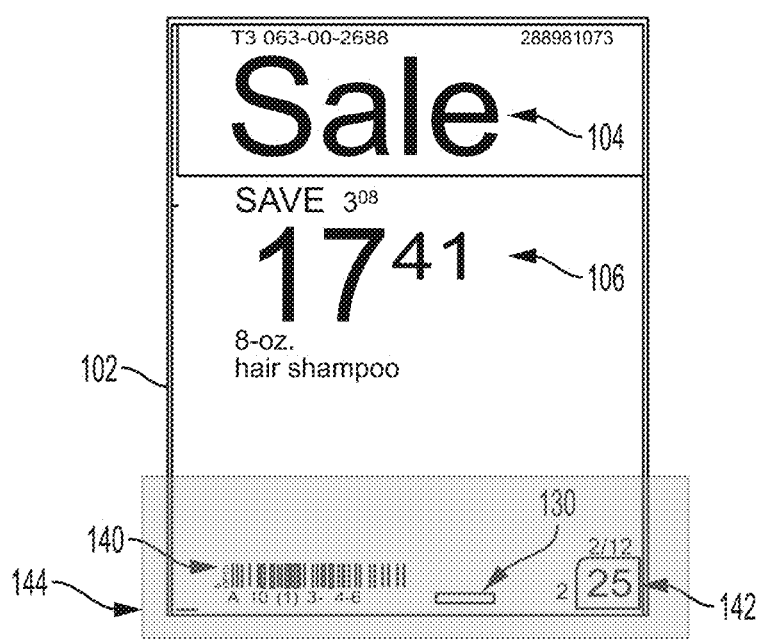
Figure 8:
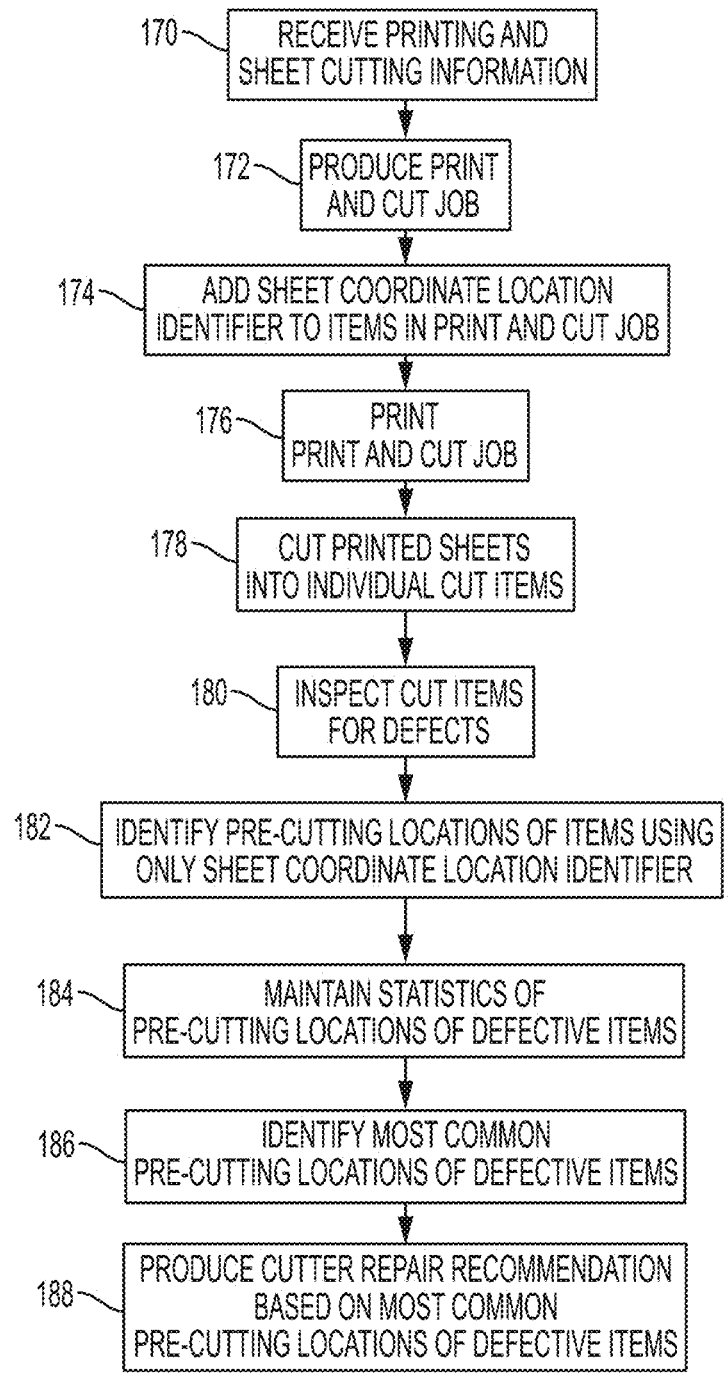
FIG. 8 is a flow diagram of various methods herein.

FIG. 6 shows that the sheet coordinate location identifier 138 can be micro-printing on the printed items 102 (where, again, the text at the end of the arrow in the drawings shows what the micro-printing would reveal when magnified). Further, FIG. 7 illustrates that the sheet coordinate location identifier 130 can be located to be obscured or hidden by a holder 144 (where the holder 144 is shown in transparent form in FIG. 7) into which the cut items 102 can be subsequently mounted. While some examples of sheet coordinate location identifiers 132-138 are shown in the drawings, the sheet coordinate location identifier 130 can take any form, so long as it identifies the pre-cutting sheet location, and is not limited to the foregoing examples.

Therefore, with the above, pre-cutting locations of the defective items 102 (items improperly cut, improperly stacked; or containing smears, marks, or folds, etc.) are identifiable using only the sheet coordinate location identifier 130 printed on the items 102. Such sheet location information can be manually identified by operators (and the locations indicated by the sheet coordinate location identifier 130 printed on the defective items 102 can be manually entered into the processor 216); or defective items 102 can be scanned in by operators, allowing the processor 216 to automatically identify the pre-cutting sheet locations of the items 102, from the printed sheet coordinate location identifier 130, to track the pre-cutting sheet locations of defective items 102.

The processor 216 automatically maintains statistics of the pre-cutting locations of the defective items 102 to identify the most common pre-cutting location of the defective items 102. The processor 216 is capable of automatically producing a repair recommendation (e.g., replace, clean, adjust, align, etc., a specific cutting blade, a specific alignment guide, a specific stacking component etc.) for the printing system based on these most common pre-cutting location of the defective items. Such repair recommendations can rely upon previously accumulated empirical data of previous successful repairs that addressed similar defects and sheet locations. For example, if the last eight out of ten of the defective items 102 all came from the same pre-cutting sheet location, and all had the same edge improperly cut, one of the blades of one of the cutters 114, 116 shown in FIG. 2 can be automatically identified as needing replacement, cleaning, adjustment, alignment, etc. This allows the systems herein to quickly determine the location of the defectively printed/cut item 102 on the sheet 100, and use this information to identify which part of the finishing system 110 is responsible for generating the anomalies. Further, this additional information can be used to track machine performance over time, allowing the design of future machines to be changed to prevent chronic defect issues from recurring.

FIG. 7 is flowchart illustrating exemplary methods herein. In item 170, these methods receive printing and sheet cutting information into a printing system. In item 172, a processor of the printing system automatically combines the printing and sheet cutting information, to produce a print and cut job that includes pages. For example, the processing in item 172 can use a variable information print job to merge the printing and sheet cutting information into the print and cut job. Each of the pages includes multiple items positioned according to coordinates. With these methods, in item 174, the processor automatically adds a sheet coordinate location identifier that corresponds to the coordinates for such items, to each of the items in the print and cut job.

In item 176, after adding the sheet coordinate location identifier to the print and cut job, such methods automatically print the print and cut job on sheets of print media using a printing device of the printing system, to produce printed sheets of items (printed items), printed on the printed sheets according to the coordinates. The printed items can be different sizes and contain different printing within each of the printed sheets. In item 178, the methods herein automatically cut the printed sheet using an automated cutting device of the printing system to separate the printed sheet, according to the coordinates, into individually cut items.

Each of the cut items produced in item 178 includes the sheet coordinate location identifier printed thereon, and this sheet coordinate location identifier printed on the cut items identifies the pre-cutting locations of the cut items within the sheets of print media (where the cut items were before the sheets of print media were cut by the automated cutting device). The sheet coordinate location identifier comprises a two-dimensional grid location within the printed sheets. The printed items include printed graphics, and the sheet coordinate location identifier can be a hidden feature within the printed graphics, or the sheet coordinate location identifier can be micro-printing on the printed items. Further, the sheet coordinate location identifier can be located to be obscured or hidden by a holder into which the cut items can be subsequently mounted.

After this, in item 180, these methods inspect the cut items for cutting defects to identify defective items. Such methods also automatically or manually identify the pre-cutting locations of the defective items, using only the sheet coordinate location identifier printed on the defective items in item 182. Further, in item 184, these methods automatically maintain statistics of the pre-cutting locations of the defective items to allow the methods (in item 186) to identify the most common pre-cutting location of the defective items. This allows these methods to produce a repair recommendation (or future machine design change) for the automated cutting device in item 188 that is based on the most common pre-cutting location of the defective items.

The hardware described herein plays a significant part in permitting the foregoing method to be performed, rather than function solely as a mechanism for permitting a solution to be achieved more quickly, (i.e., through the utilization of a computer for performing calculations). As would be understood by one ordinarily skilled in the art, the processes described herein cannot be performed by a human alone (or one operating with a pen and a pad of paper) and instead such processes can only be performed by a machine, especially because the printing and cutting job imposition of such a variable information job makes each post-cutting item unique in size and printing, and makes it impossible to trace such cut items back to original pre-cutting sheet locations. For example, if one were to manually attempt to add sheet locations to all individual items, the manual process would be sufficiently inaccurate and take an excessive amount of time so as to render the manually produced results useless. Specifically, processes such as merging electronic data streams to produce a variable information print and cutting job, updating the stored data of the print and cutting job to add the sheet coordinate location identifier to the printing data, using the methods to automatically provide a different sheet coordinate location identifier for each different item on a sheet, electronically storing revised data, etc., requires the utilization of different specialized machines, and humans performing such processing would not produce useful results because of the time lag, inconsistency, and inaccuracy humans would introduce into the results.

Further, such machine-only processes are not mere "post-solution activity" because the methods utilize machines at each step, and cannot be performed without machines. Specifically, the processing herein alters the electronically maintained variable information data regarding where a printer will print items on a sheet, where a cutter will cut that printed sheet, etc. In other words, these various machines are integral with the methods herein because the printing and cutting cannot be performed without such special purpose machines (and cannot be performed by humans alone).

Additionally, the methods herein solve many highly complex technological problems. For example, as mentioned above, it is difficult or impossible to determine the pre-cutting location of an item after the sheet has been cut into individual items. The processing herein makes such information readily available, and uses such information to automatically make very specific repair recommendations. This reduces the amount of time it takes to repair machines by quickly identifying the location of what needs to be repaired, as contrasted with the general concept that a part needs to be repaired (e.g., the processing herein identifies the specific blade that needs to be cleaned, sharpened, or replaced, etc., as contrasted with a general recommendation to clean, sharpen, or replace all blades, etc.).

In doing so, the methods and systems herein greatly encourage designs of machines to be changed by statistically tracking the specific part of the machine that regularly causes defects. Thus, these methods and systems allow users to properly design machines to eliminate problems with undesirable, defect-producing cutting and printing equipment.

Figure 9:
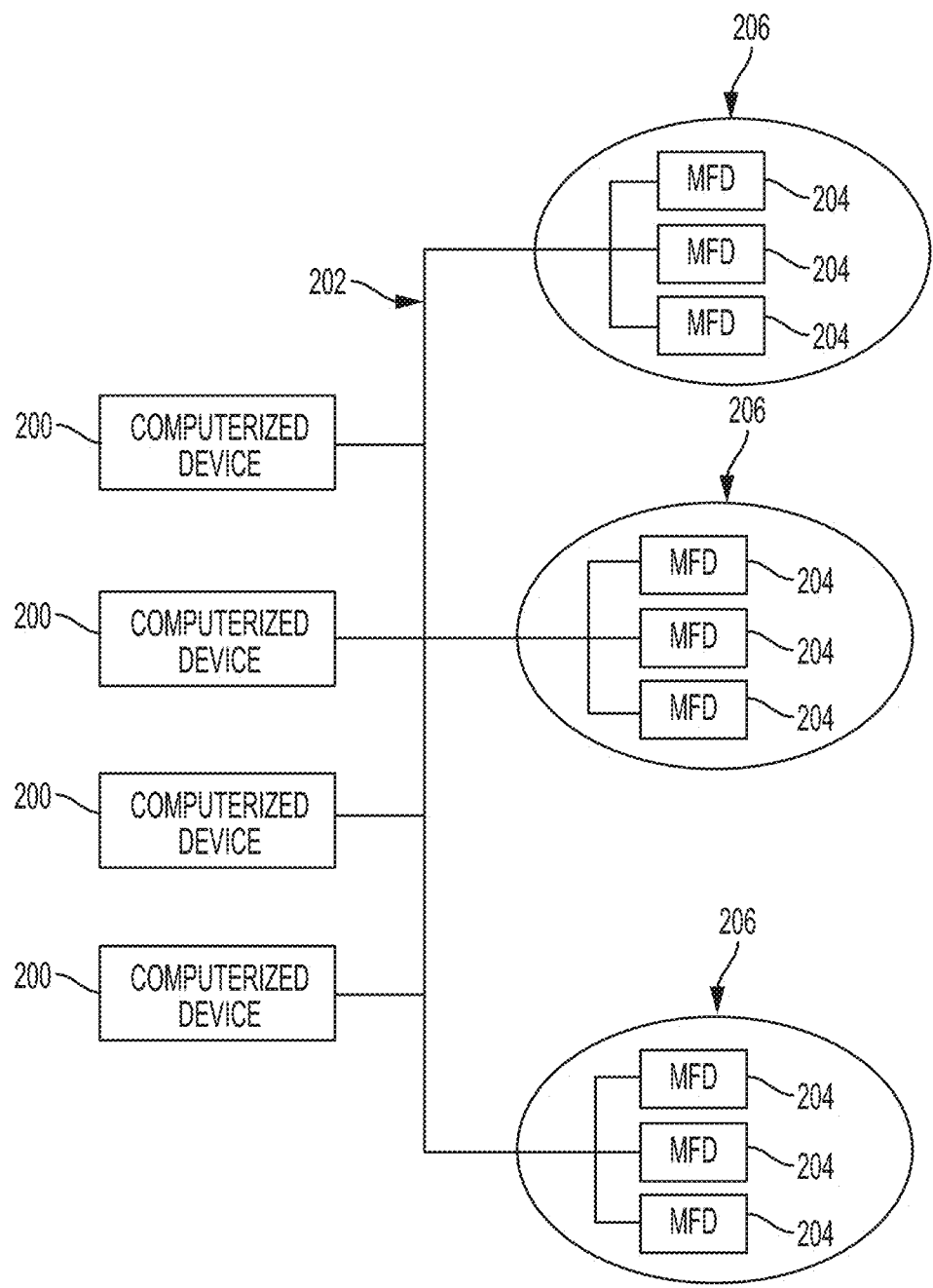
FIG. 9 is a schematic diagram illustrating systems herein.

As shown in FIG. 9, exemplary systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 10:
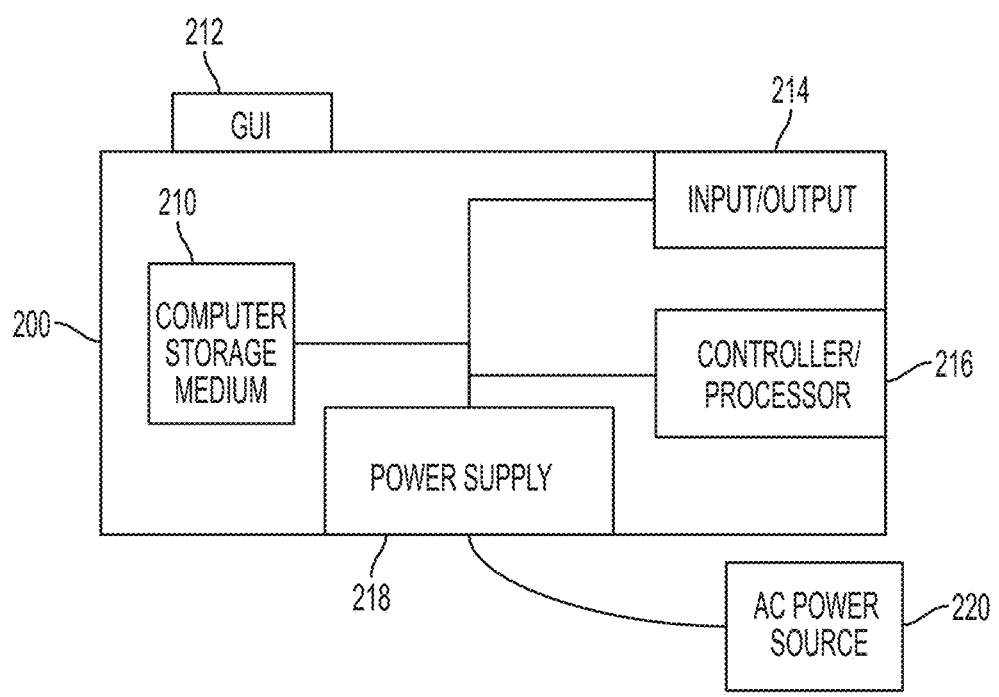
FIG. 10 is a schematic diagram illustrating devices herein.

FIG. 10 illustrates a computerized device 200, which can be used with systems and methods herein and can comprise, for example, a print server, a personal computer, a portable computing device, etc. The computerized device 200 includes a controller/tangible processor 216 and a communications port (input/output) 214 operatively connected to the tangible processor 216 and to the computerized network 202 external to the computerized device 200. Also, the computerized device 200 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the computerized device 200 and comprises a wired device or wireless device (of any form, whether currently known or developed in the future). The tangible processor 216 controls the various actions of the computerized device. A non-transitory, tangible, computer storage medium device 210 (which can be optical, magnetic, capacitor based, etc., and is different from a transitory signal) is readable by the tangible processor 216 and stores instructions that the tangible processor 216 executes to allow the computerized device to perform its various functions, such as those described herein. Thus, as shown in FIG. 10, a body housing has one or more functional components that operate on power supplied from an alternating current (AC) source 220 by the power supply 218. The power supply 218 can comprise a common power conversion unit, power storage element (e.g., a battery, etc), etc.

Figure 11:
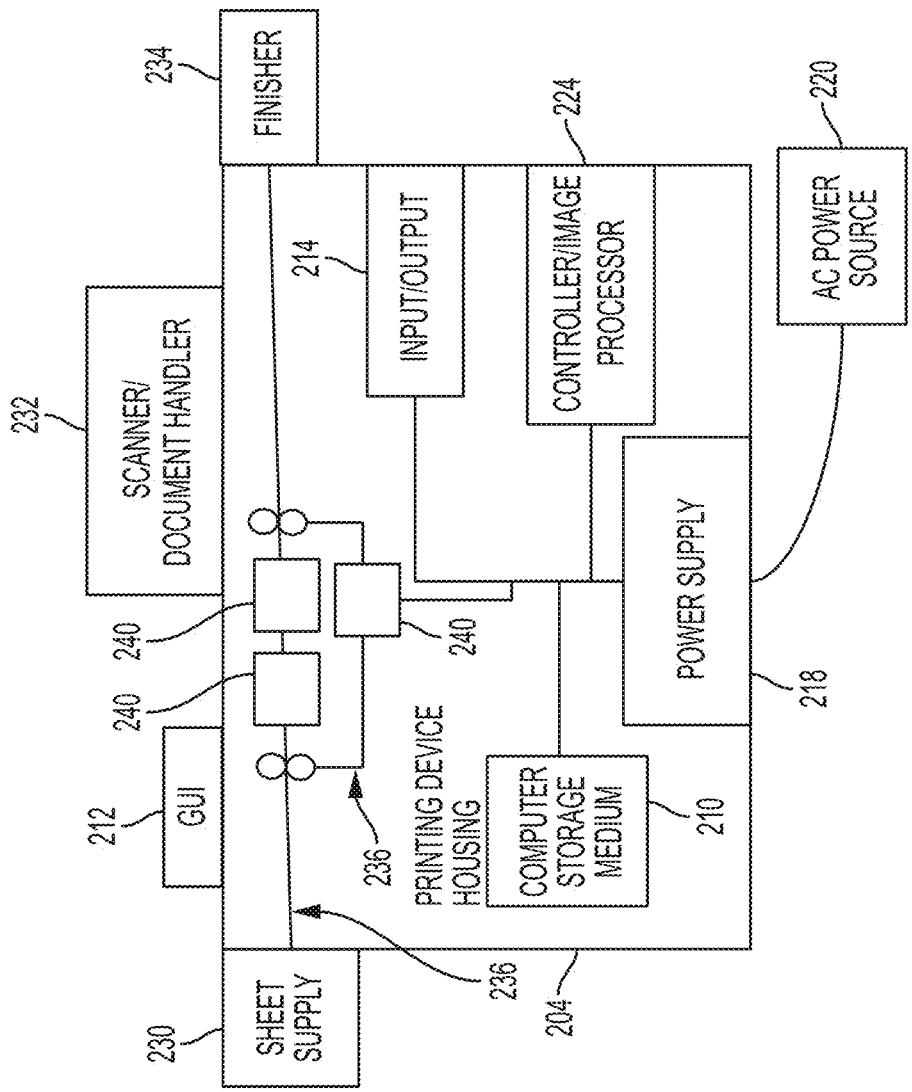
FIG. 11 is a schematic diagram illustrating devices herein.

FIG. 11 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engine(s)) 240 operatively connected to a specialized image processor 224 (that is different from a general purpose computer because it is specialized for processing image data), a media path 236 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

The one or more printing engines 240 are intended to illustrate any marking device that applies a marking material (toner, inks, etc.) to continuous media or sheets of media, whether currently known or developed in the future and can include, for example, devices that use a photoreceptor belt or an intermediate transfer belt, or devices that print directly to print media (e.g., inkjet printers, ribbon-based contact printers, etc.).

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners, and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, book-making machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

A scanner is one image capture device that optically scans images, print media, and the like, and converts the scanned image into a digitized format. Common scanning devices include variations of the flatbed scanner, generally known in the arts, wherein specialized image receptors move beneath a platen and scan the media placed on the platen. Modern digital scanners typically incorporate a charge-coupled device (CCD) or a contact image sensor (CIS) as the image sensing receptor(s). The scanning device produces a signal of the scanned image data. Such a digital signal contains information about pixels such as color value, intensity, and their location within the scanned image.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
   receiving printing and sheet cutting information into a printing system;
   automatically combining, by a processor of said printing system, said printing and sheet cutting information, to produce a print and cut job that includes pages, each of said pages includes multiple items positioned according to coordinates;
   automatically adding, by said processor, a sheet coordinate location identifier that corresponds to said coordinates for said items to each of said items in said print and cut job;
   automatically printing said print and cut job on sheets of print media using a printing device of said printing system, to produce printed sheets of said items printed as printed items on said printed sheets according to said coordinates;

automatically cutting said printed sheet using an automated cutting device of said printing system to separate said printed sheet, according to said coordinates, into individually cut items, each of said cut items includes said sheet coordinate location identifier printed thereon, each said sheet coordinate location identifier contains printed data that uniquely identifies a different one of multiple pre-cutting locations of said cut items, each of said pre-cutting locations of said cut items is a different location within said sheets of print media before said sheets of print media were cut by said automated cutting device, and said sheet coordinate location identifier remains on said cut items after said printed sheet has been cut and said cut items have been separated from said printed sheet;

inspecting said cut items for defects to identify defective items;

automatically identifying said pre-cutting locations of said defective items, using only said sheet coordinate location identifier;

automatically maintaining statistics of said pre-cutting locations of said defective items to identify a most common pre-cutting location of said defective items; and automatically producing a repair recommendation for said printing system based on said most common pre-cutting location of said defective items.

2. The method according to claim 1, said sheet coordinate location identifier comprises a two-dimensional grid location within said printed sheets.

3. The method according to claim 1, said printed items include printed graphics, and said sheet coordinate location identifier comprises a hidden feature within said printed graphics.

4. The method according to claim 1, said sheet coordinate location identifier comprises micro-printing on said printed items.

5. The method according to claim 1, further comprising mounting said cut items in a holder, and said sheet coordinate location identifier is hidden by said holder when said cut items are mounted in said holder.

6. The method according to claim 1, said combining comprises using a variable information print job to merge said printing and sheet cutting information into said print and cut job.

7. The method according to claim 1, said printed items contain different printing within each of said printed sheets.

8. A method comprising:

receiving printing and sheet cutting information into a printing system;

automatically combining, by a processor of said printing system, said printing and sheet cutting information, to produce a print and cut job that includes pages, each of said pages includes multiple items positioned according to coordinates;

automatically adding, by said processor, a sheet coordinate location identifier that corresponds to said coordinates for said items to each of said items in said print and cut job;

automatically printing said print and cut job on sheets of print media using a printing device of said printing system, to produce printed sheets of said items printed as printed items on said printed sheets according to said coordinates;

automatically cutting said printed sheet using an automated cutting device of said printing system to separate said printed sheet, according to said coordinates, into individually cut items, each of said cut items includes said sheet coordinate location identifier printed thereon, each said sheet coordinate location identifier contains printed data that uniquely identifies a different one of multiple pre-cutting locations of said cut items, each of said pre-cutting locations of said cut items is a different location within said sheets of print media before said sheets of print media were cut by said automated cutting device, and said sheet coordinate location identifier remains on said cut items after said printed sheet has been cut and said cut items have been separated from said printed sheet;

inspecting said cut items for cutting defects to identify defective items;

automatically identifying said pre-cutting locations of said defective items, using only said sheet coordinate location identifier;

automatically maintaining statistics of said pre-cutting locations of said defective items to identify a most common pre-cutting location of said defective items; and automatically producing a repair recommendation for said automated cutting device based on said most common pre-cutting location of said defective items.

9. The method according to claim 8, said sheet coordinate location identifier comprises a two-dimensional grid location within said printed sheets.

10. The method according to claim 8, said printed items include printed graphics, and said sheet coordinate location identifier comprises a hidden feature within said printed graphics.

11. The method according to claim 8, said sheet coordinate location identifier comprises micro-printing on said printed items.

12. The method according to claim 8, further comprising mounting said cut items in a holder, and said sheet coordinate location identifier is hidden by said holder when said cut items are mounted in said holder.

13. The method according to claim 8, said combining comprises using a variable information print job to merge said printing and sheet cutting information into said print and cut job.

14. The method according to claim 8, said printed items contain different printing within each of said printed sheets.

15. A printing system comprising:

a processor, said processor is capable of using printing and sheet cutting information to automatically produce a print and cut job that includes pages, each of said pages includes multiple items positioned according to coordinates, and said processor automatically adds a sheet coordinate location identifier that corresponds to said coordinates for said items to each of said items in said print and cut job;

a printing device, said printing device is capable of automatically printing said print and cut job on sheets of print media to produce printed sheets of said items, printed as printed items on said printed sheets according to said coordinates; and an automated cutting device, said automated cutting device is capable of automatically cutting said printed sheet to separate said printed sheet, according to said coordinates, into individually cut items, each of said cut items includes said sheet coordinate location identifier printed thereon, each said sheet coordinate location identifier contains printed data that uniquely identifies a different one of multiple pre-cutting locations of said cut items, each of said pre-cutting locations of said cut items is a different location within said sheets of print media before said sheets of print media were cut by said automated cutting device, and said sheet coordinate location identifier remains on said cut items after said printed sheet has been cut and said cut items have been separated from said printed sheet, defective ones of said cut items comprise defective items, said processor is capable of automatically identifying said pre-cutting locations of said defective items, using only said sheet coordinate location identifier, said processor is capable of automatically maintaining statistics of said pre-cutting locations of said defective items to identify a most common pre-cutting location of said defective items, and said processor is capable of automatically producing a repair recommendation for said automated cutting device based on said most common pre-cutting location of said defective items.

16. The printing system according to claim 15, said sheet coordinate location identifier comprises a two-dimensional grid location within said printed sheets.

17. The printing system according to claim 15, said printed items include printed graphics, and said sheet coordinate location identifier comprises a hidden feature within said printed graphics.

18. The printing system according to claim 15, said sheet coordinate location identifier comprises micro-printing on said printed items.

19. The printing system according to claim 15, said cut items are mountable in a holder, and said sheet coordinate location identifier is hidden by said holder when said cut items are mounted in said holder.

20. The printing system according to claim 15, said processor produces said print and cut job by combining said printing and sheet cutting information into said print and cut job using a variable information print job, and said printed items contain different printing within each of said printed sheets.

* * * * *